(12) United States Patent
Franks et al.

(10) Patent No.: US 11,960,950 B1
(45) Date of Patent: *Apr. 16, 2024

(54) APPARATUSES, METHODS AND SYSTEMS FOR TRACKING ARTICLES USING CUSTOMIZED INDICIA

(71) Applicant: Bell Lumber & Pole Company, New Brighton, MN (US)

(72) Inventors: Brett Franks, New Brighton, MN (US); Joshua Schindeldecker, New Brighton, MN (US)

(73) Assignee: BELL LUMBER & POLE COMPANY, New Brighton, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/859,779

(22) Filed: Jul. 7, 2022

Related U.S. Application Data

(63) Continuation of application No. 17/238,189, filed on Apr. 22, 2021, now Pat. No. 11,410,008.

(60) Provisional application No. 63/014,456, filed on Apr. 23, 2020.

(51) Int. Cl.
*G06K 19/06* (2006.01)

(52) U.S. Cl.
CPC . *G06K 19/06037* (2013.01); *G06K 19/06028* (2013.01)

(58) Field of Classification Search
None
See application file for complete search history.

(56) References Cited

U.S. PATENT DOCUMENTS

| | | | |
|---|---|---|---|
| 6,007,929 A * | 12/1999 | Robertson | B41M 5/24 427/595 |
| 7,654,464 B2 * | 2/2010 | Babine | G06Q 10/087 235/487 |
| 11,410,008 B1 * | 8/2022 | Franks | G06K 19/06037 |
| 2002/0014266 A1 * | 2/2002 | Zaiser | G09F 3/02 137/505 |
| 2016/0046136 A1 * | 2/2016 | Jordan | B41J 2/01 347/102 |
| 2019/0043148 A1 * | 2/2019 | Vemury | G06K 19/06037 |
| 2021/0089735 A1 * | 3/2021 | Martin | G06F 16/901 |

* cited by examiner

*Primary Examiner* — Kristy A Haupt
(74) *Attorney, Agent, or Firm* — Winthrop & Weinstine, P.A.; Alicia Griffin Mills; Nadeem W. Schwen

(57) ABSTRACT

In accordance with one aspect, the present disclosure is directed to methods, systems and machine readable media including computer programs to track information for an article of manufacture. An illustrative method includes providing a blank tag for the article of manufacture, and forming a marked tag from the blank tag by forming at least one character on the blank tag using a light source, such as a laser. The at least one character can be encoded with information relating to the article of manufacture.

17 Claims, 4 Drawing Sheets

APPARATUSES, METHODS AND SYSTEMS FOR TRACKING ARTICLES USING CUSTOMIZED INDICIA

CROSS-REFERENCE TO RELATED APPLICATION

This application is a continuation of and claims the benefit of priority to U.S. patent application Ser. No. 17/238,189, filed Apr. 22, 2021, which in turn claims the benefit of priority to U.S. Provisional Application No. 63/014,456, filed Apr. 23, 2020. Each of the foregoing applications is incorporated by reference herein in its entirety for all purposes.

COPYRIGHT NOTICE

This application for letters patent discloses and describes various novel innovations and inventive aspects of making and using identification indicia (hereinafter "disclosure") and contains material that is subject to copyright, mask work, or other intellectual property protection. The respective owners of such intellectual property have no objection to the facsimile reproduction of the disclosure by anyone as it appears in published Patent Office file/records, but otherwise reserve all rights.

FIELD

The present innovations generally address improvements for tracking articles over their useful lives, particularly where the articles can be subject to corrosive or otherwise harsh environments. However, in order to develop a reader's understanding of the innovations, descriptions have been compiled into a single disclosure to illustrate and clarify how aspects of these innovations operate independently, interoperate as between individual innovations, or cooperate collectively. The application goes on to further describe the interrelations and synergies as between the various innovations; all of which is to further comply with 35 U.S.C. § 112.

BACKGROUND

Articles that are exposed to harsh environments, such as utility poles and the like, must be marked with a branding or a metallic tag. Markings such as these tags have to endure extreme weather environments, yet need to be legible months and even years after installation. The present disclosure provides improvements on the state of the art.

SUMMARY

Advantages of the present disclosure will be set forth in and become apparent from the description that follows. Additional advantages of the disclosure will be realized and attained by the methods and systems particularly pointed out in the written description and claims hereof, as well as from the appended drawings.

In some implementations, the disclosure provides a method for tracking information for an article of manufacture. An illustrative method includes providing a blank tag for the article of manufacture, and forming a marked tag from the blank tag by forming at least one character on the blank tag using a light source. The at least one character is encoded with information relating to the article of manufacture.

In some implementations, the blank tag can include a plurality of layers of material. If desired, the light source can include a laser, and further wherein the laser ablates at least a portion of an outermost layer of said plurality of layers to form said at least one character. If desired, the outermost layer can include pigment, such as in the form of a painted layer, or in the form of an anodized layer. The at least one character can include a bar code, a QR code, logo, or other visual information bearing indicia. If desired, the at least one character can include encrypted information.

In some implementations, the light source can include a laser. The blank tag can include a plurality of layers that can be ablated by the laser. Information can be encoded into the blank tag by selectively ablating a first layer of material in a first location of the tag to encode information into the tag, and selectively first and second layers of material in a second location of the tag to encode further information. In some embodiments, forming the at least one character (such as with a laser) can cause a portion of material forming the tag to become oxidized. In some instances, oxidizing the material forming the tag can enhance visual contrast of the at least one character with respect to a portion of the tag that surrounds said at least one character.

In some implementations, the article of manufacture can be a utility pole or structure. The at least one character can include, for example, information relating to a URL that includes data relating to the utility pole or structure. For example, the information or data can relate to one or more of (i) a species of tree that the utility pole or structure is formed from, (ii) at least one preservative/preservative system used to manufacture the utility pole or structure, (iii) a location where the utility pole or structure was treated with the preservative/preservative system, (iv) a length of the utility pole or structure, (v) a year in which the utility pole or structure was treated with the preservative/preservative system, (vi) the year in which the tree was felled that was used to make the utility pole or structure, (vii) an inspection agency tasked with inspecting the utility pole or structure, (viii) a logo of a utility company, (ix) a URL leading to a customer portal of a utility, (x) a URL leading to a portal of a utility company for an inspector, (xi) a unique tracking number corresponding to the utility pole or structure, (xii) a storage location for the utility pole or structure, (xiii) a date of installation of a utility pole or structure, (xiv) the class of the utility pole or structure, (xv) the month of manufacture of the utility pole or structure, or (xvi) any third party associations, for example. The disclosed method(s) can further include disposing the tag on the article of manufacture, such as by attachment by way of fasteners (e.g., nail(s), screw(s)), rivet(s), adhesives, and the like.

The disclosure further provides methods of inspecting or treating an article of manufacture. The method can include scanning a marked tag as disclosed herein that is disposed on an article of manufacture, accessing a maintenance portal relating to the article of manufacture, conducting a maintenance or treatment procedure on the article of manufacture, and inputting data into the maintenance portal describing the maintenance or treatment procedure.

In some implementations, methods are provided wherein the forming step of the tag can include programming a computer operably coupled to the light source to form the at least one character on the blank tag. If desired, programming the computer can include populating a plurality of data fields, wherein each of the data fields can be mapped to a different physical region of the blank tag. If desired, one or more of the data fields can include an incremental unit number assigned to the tag that is automatically incremented for a further tag. Thus subsequent tags for a batch of articles of manufacture can have incremented serial numbers, for example, wherein software used to implement formation of the character (s) (or other indicia) can be programmed to assign numerical values to the indicia as desired.

In some implementations, the article of manufacture can be an engineered structural or commercial member, including but not limited to (i) a laminated structural or commercial member, (ii) a column, (iii) a beam, (iv) a truss, and the like. In other implementations, the article of manufacture can include one or more of (i) an internal combustion engine, (ii) a component of a vehicle, (iii) a lamp pole, (iv) an industrial commodity, (v) a commercial structure, (vi) a pump, (vii) a generator, and the like.

In some implementations, the tag can be formed at least in part by depositing a layer of material on the a blank tag that includes at least one pigment. The pigment, which may be mixed with other materials, can be deposited in a variety of manners. For example, the layer of material may include one or more pigments and may be deposited by anodizing, or by way of a printer that is operably coupled to the processor circuit. If desired, the light source can be configured to interact with the layer of material deposited by the printer. For example, the light source can interact with the layer of material deposited by the printer by curing at least a portion of the layer of material. Additionally or alternatively, the light source can cause a portion of the layer of material to be ablated. In further implementations, more than one light source can be provided. For example, a first light source can be provided to cure or otherwise form the layer of material, and a second light source can be used to alter the appearance of or ablate the layer of material.

In further implementations, the light source can interact with the layer of material deposited by the printer by melting at least a portion of the layer of material. For example, the layer of material can include a powder or a slurry that may or may not include an infrared absorbing material, and the light source can include an infrared lamp or laser or other type of laser, that emits light at a sufficient frequency and power level to cause the material to fuse to itself and to the tag.

In some embodiments, the printer can include a printer circuit operably coupled to the processor circuit, and at least one of the processor circuit and the printer circuit can be configured to deposit the layer of material in a color that matches predetermined color coordinates. For example, the color coordinates can be defined in accordance with L*a*b* color space. If desired, the color coordinates can be defined as a Pantone color. If desired, the method can include directly measuring the color coordinates of the tag after the layer of material has been deposited to confirm that the color coordinates of the deposited material are within a predetermined tolerance.

In some embodiments, at least a portion of the marked tag has a surface roughness $R_a$ below a predetermined threshold after it is formed. For example, the predetermined threshold can be below 0.1 micron, below 10 microns, or below 100 microns. If desired, the surface roughness $R_a$ can be between about 0.1 microns and about 100 microns, or any increment therebetween of 0.1 microns, inclusive of the endpoints of that range. If desired, the surface roughness $R_a$ can be within any subrange between about 0.1 microns and about 100 microns that is between about 0.5 microns and about 20 microns. Typically, smoother surfaces are less likely to get soiled, are easier to clean, and are less likely to gather materials over time that can lead to corrosion.

In some implementations, at least a portion of the marked tag can include a hydrophobic coating, a hydrophilic coating, and/or a UV-resistant coating. If desired, the coating can be deposited on the tag prior to or after marking. In some implementations, the coating can include a fluorinated material, such as polytetrafluoroethylene (PTFE), polyvinylidene fluoride (PVDF), or others, for example.

In further accordance with the disclosure, an apparatus for forming tracking information for an article of manufacture is provided. Certain implementations of the apparatus can include a memory circuit including data stored thereon in machine readable format. The data can relate to an article of manufacture. The apparatus can further include a light source including a light source control circuit operable to operate the light source. The apparatus can still further include a processor circuit operably coupled to the memory circuit and the light source control circuit. The processor circuit can be configured to operate the light source. The processor circuit executes instructions to retrieve from said memory circuit said data relating to said article of manufacture, and operate said light source to form at least one character into a surface of an identification tag, said at least one character being encoded with said data relating to said article of manufacture.

In some implementations, the memory circuit can be operably coupled to a company database including customer data. If desired, the processor circuit can be operably coupled to a scanner configured to read information. The processor circuit can execute instructions to operate the scanner to read information and extract and store information in the memory circuit. Information obtained via said scanner can include the data relating to the article of manufacture. In some implementations, the processor circuit can further execute instructions to encrypt said data prior to forming said at least one character into said identification tag.

In some implementations, the processor circuit can execute instructions to prioritize production of a first set of identification tags over production of a second set of identification tags. For example, the processor circuit can execute instructions to prioritize production of a first set of identification tags over production of a second set of identification tags in order to synchronize production of the identification tags with production of articles of manufacture that will bear identification tags from the first set of identification tags. The processor circuit can executes instructions to prioritize production of a first set of identification tags over production of a second set of identification tags in response to a work order being processed by the processor circuit. If desired, the processor circuit can execute instructions to prioritize production of a first set of identification tags over production of a second set of identification tags in response to a change in a work order being processed by the processor circuit. In some implementations, the processor circuit can execute instructions to prioritize production of a first set of identification tags over production of a second set of identification tags in response to a work order being released, wherein the work order is released in response to the receipt of user input.

The disclosure further provides a non-transitory machine readable medium storing instructions executable by a processor circuit of an apparatus for forming tracking information for an article of manufacture including a memory circuit, a light source and a processor circuit. When executed by the processor, the instructions cause the processor circuit to retrieve the data relating to an article of manufacture from the memory circuit, and operate the light source to form at least one character into a surface of an identification tag, the at least one character being encoded with said data relating to the article of manufacture.

In further accordance with the disclosure, a non-transitory machine readable medium is provided storing instructions executable by a processor circuit of an apparatus for facilitating inspection of an article of manufacture. The apparatus includes a scanner and a network connection. The instructions, when executed by the processor, cause the processor circuit to scan a marked tag as described elsewhere herein disposed on the article of manufacture, access a maintenance portal relating to the article of manufacture, and transmit data by way of the network connection describing a maintenance or treatment procedure conducted on the article of manufacture.

It is to be understood that the foregoing general description and the following detailed description are exemplary and are intended to provide further explanation of the disclosed embodiments. The accompanying drawings, which are incorporated in and constitute part of this specification, are included to illustrate and provide a further understanding of the disclosed methods and systems. Together with the description, the drawings serve to explain principles of the disclosure.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure.

The accompanying appendices and/or drawings illustrate various non-limiting, example, innovative aspects in accordance with the present descriptions.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Reference will now be made in detail to the present preferred embodiments of the disclosure, examples of which are illustrated in the accompanying drawings. The methods and corresponding steps of the disclosed embodiments will be described in conjunction with the detailed description of the system.

The present disclosure provides methods, devices and computer readable media including computer readable instructions to facilitate the tracking of information for an article of manufacture, such as a wooden utility pole or structure, as well as any suitable non-wooden structure, such as structures made from metal, plastic, fiberglass, concrete, and the like.

Figure 1:
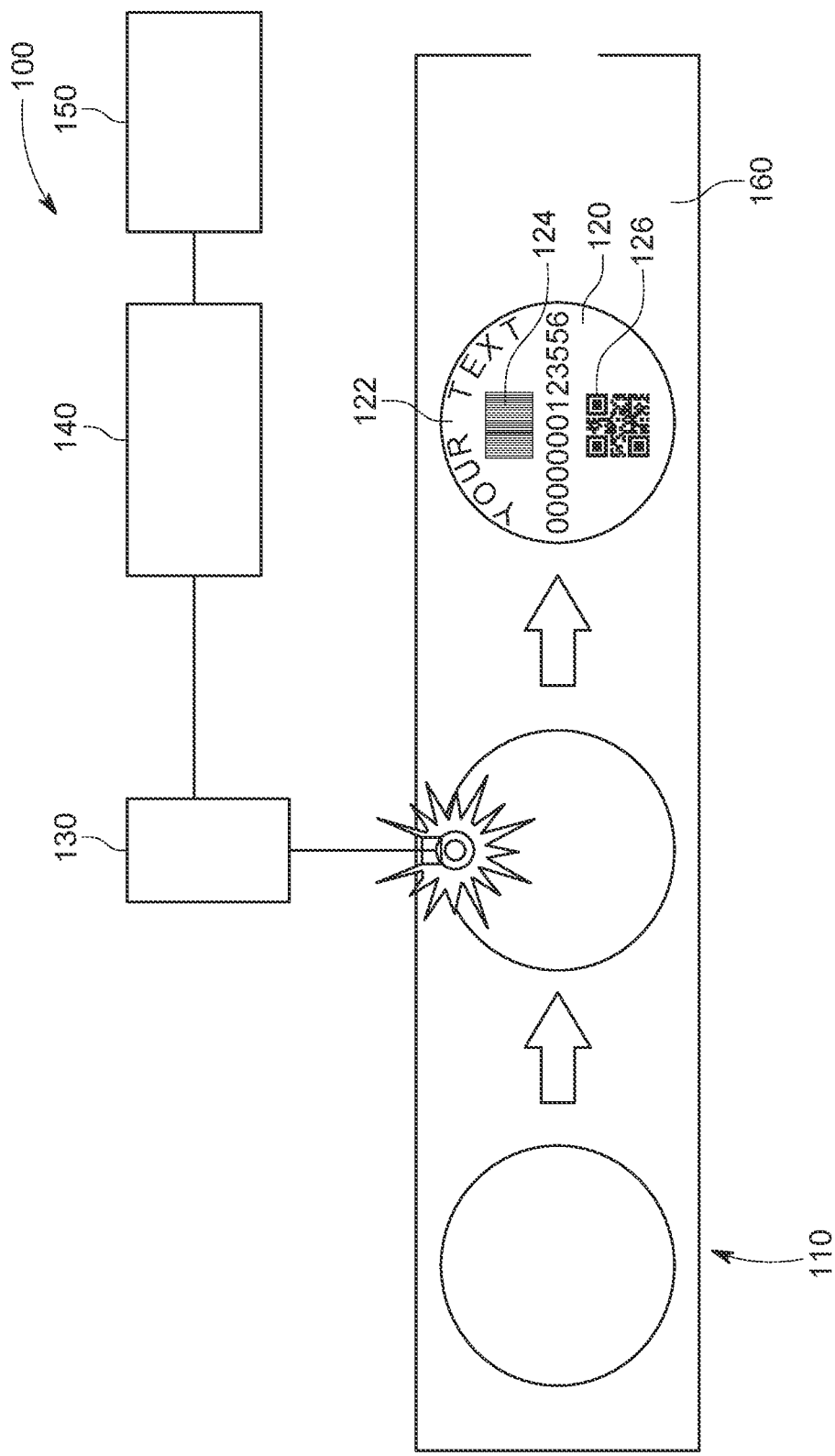
FIG. 1 shows a schematic of a system and method in accordance with the present disclosure.

For purposes of illustration, and not limitation, FIG. 1 shows aspects of an illustrative method and associated apparatus 100 for forming an identification tag. The device 100 includes a conveyor belt 160 or similar structure that conveys a blank tag 110 to be marked along a path of travel. The blank tag 110 may originate from a dispenser or other source of blank tags (not shown). The conveyor belt 160 is operably coupled to a computer or controller 140. Computer/controller 140 is in turn operably coupled to a light source 130 such as a laser and to a database including information that the controller 140 references for operating the light source 130 and the conveyor 160. In use, the system dispenses a blank tag 110 onto the conveyor 160. The conveyor routes the blank tag 110 into a target zone of the light source/laser 130. The laser is operated by the controller 140 by way of computer readable instructions that are configured to cause the laser to ablate material on the surface of the blank tag 110 to form a marked tag from the blank tag. The laser 130 (or other light source) is operable to form a variety of indicia on the surface of the blank tag 110 as illustrated in FIG. 1 such as a bar code 124, a QR code 126, a logo, or the like. If desired, the indicia can include a serial number or other indicia 120 that can be incremented (e.g., in increments of 1) from one blank tag to the next. Also, it will be appreciated that the indicia can have any shape or follow any path, be it linear or non-linear, as long as the indicia can be formed by the light source. For example, indicia 122 can wrap along the curved edge of the tag 110.

In some embodiments, forming the at least one character 120 (such as with a laser 130) can cause a portion of material forming the tag to become oxidized, such as when using a tag that includes a layer (e.g., 117) of aluminum. In some instances, oxidizing the material forming the tag 110 can enhance visual contrast of the at least one character with respect to a portion of the tag that surrounds said at least one character. For example, oxidizing an aluminum material can result in encoded information that is white in color, or nearly white in color. When the remainder of the tag is a relatively dark color this can provide for enhanced visual contrast that can make it possible for a user to view and interpret indicia formed on the tag 110 from a distance. Moreover, it is also possible to provide enhanced visual contrast by creating a dark colored character on a lighter colored background, such as a metallic background with a mill finish.

In some implementations, methods are provided wherein the forming step of the tag can include programming a computer 140 operably coupled to the light source 130 to form the at least one character 120 on the blank tag. If desired, programming the computer can include populating a plurality of data fields, wherein each of the data fields can be mapped to a different physical region of the blank tag 120a-120f as illustrated in FIG. 2B. If desired, one or more of the data fields can include an incremental (or decremental) unit number or serial number assigned to the tag that is automatically incremented (or decremented) for a further tag. Thus subsequent tags for a batch of articles of manufacture can have incremented (or decremental) serial numbers, for example, wherein software used to implement formation of the character (s) (or other indicia) can be programmed to assign numerical values to the indicia as desired.

The indicia or characters 120 can encode information relating to an article of manufacture on which the tag 110 is later mounted. For example, the article of manufacture can be a wooden utility pole or structure or a lamp post, among other things. In the instance of a wooden utility pole or structure, the at least one character or indicia 120 can include, for example, information relating to a URL that includes data relating to the utility pole or structure. If desired, the indicia 120 can include embedded information that can permit a user to photograph the tag using a smart device (e.g., "smart phone"), wherein the smart phone is programmed to parse and process information in the indicia that opens a portal on an Internet browser or to perform a different function.

Information may be embedded in the tag and/or on a database remote from the tag, wherein information on the tag (such as encrypted information) may permit a user to access the data on a remote server and database. Regardless of where the data is stored, the data can relate to one or more of (i) a species of tree that the utility pole or structure is formed from, (ii) at least one preservative (including a single chemical, for example, or preservative system) used to manufacture the utility pole or structure, (iii) a location where the utility pole or structure was treated with the preservative/preservative system, (iv) a length of the utility pole, (v) a year in which the utility pole or structure was treated with the preservative/preservative system, (vi) the year in which the tree was felled that was used to make the utility pole or structure, (vii) an inspection agency tasked with inspecting the utility pole or structure, (viii) a logo of a utility company that is responsible for the pole, (ix) a URL leading to a customer portal of a utility, (x) a URL leading to an inspection or maintenance portal of a utility company for an inspector, (xi) a unique tracking number corresponding to the utility pole or structure, (xii) a storage location for the utility pole or structure, (xiii) a date of installation of a utility pole or structure, (xiv) the class of the utility pole or structure, (xv) the month of manufacture of the utility pole or structure, or (xvi) any third party associations, for example.

In further implementations, the article of manufacture can be an engineered structural or commercial member, including but not limited to (i) a laminated structural or commercial member, (ii) a column, (iii) a beam, (iv) a truss, and the like. In still other implementations, the article of manufacture can include one or more of (i) an internal combustion engine, (ii) a component of a vehicle, (iii) a lamp pole, (iv) an industrial commodity, (v) a commercial structure, and the like. For example, unique identification tags can be formed for engines or engine parts that are located in hostile locations.

Figure 2A:
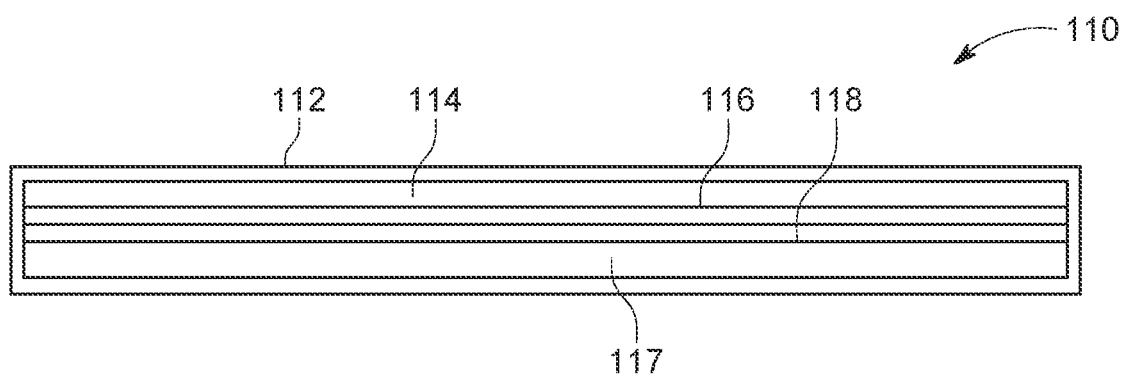
FIG. 2A shows a cross sectional view of a blank tag in accordance with the present disclosure.
Figure 2B:
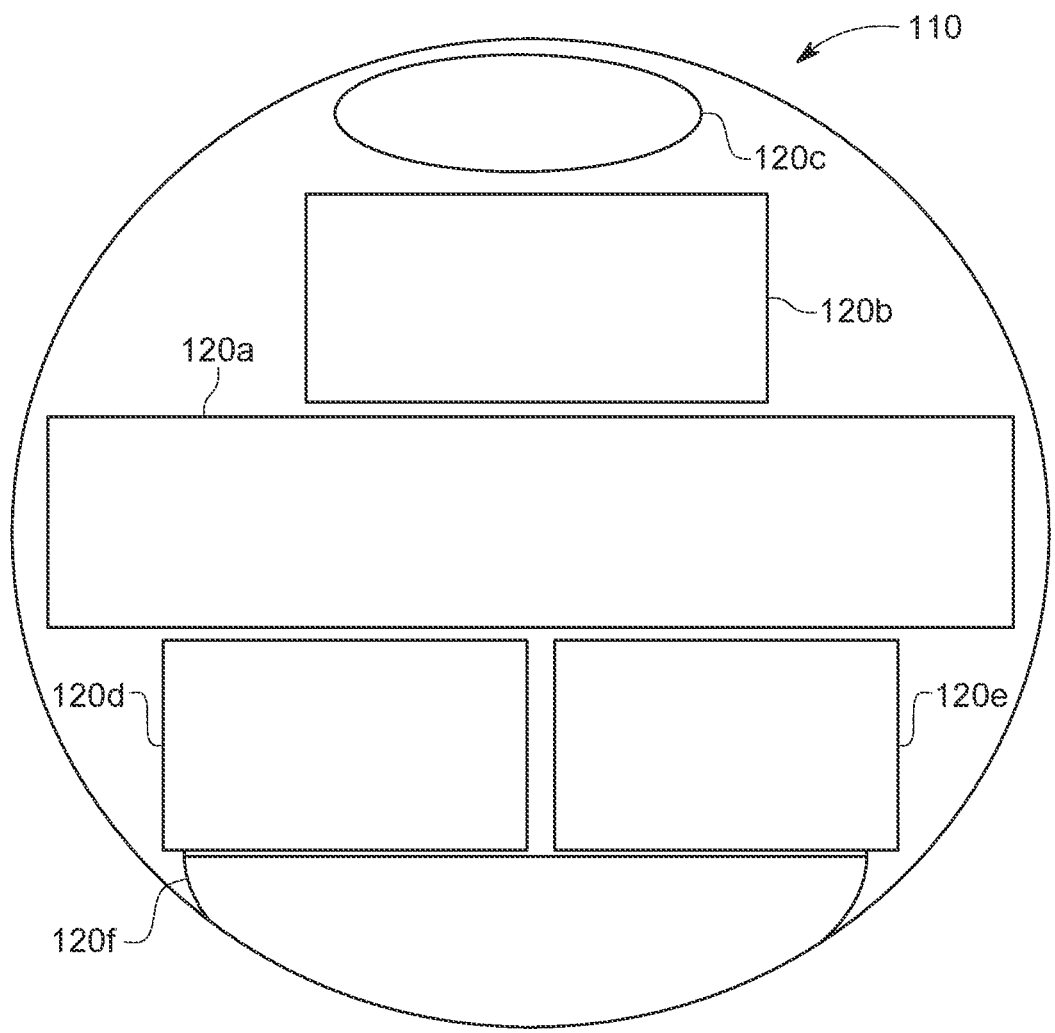
FIG. 2B shows a plan view of a blank tag in accordance with the present disclosure.
Figure 3A:
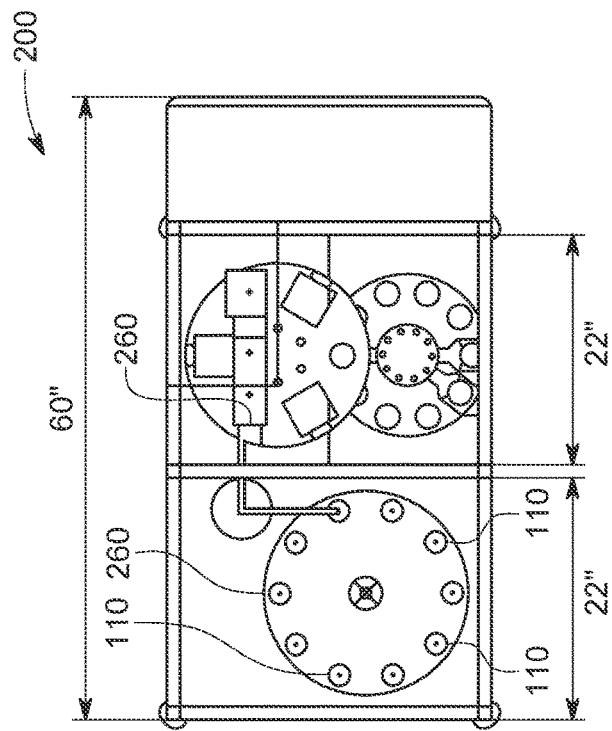
FIG. 3A shows a further embodiment of a system in accordance with the present disclosure.
Figure 3B:
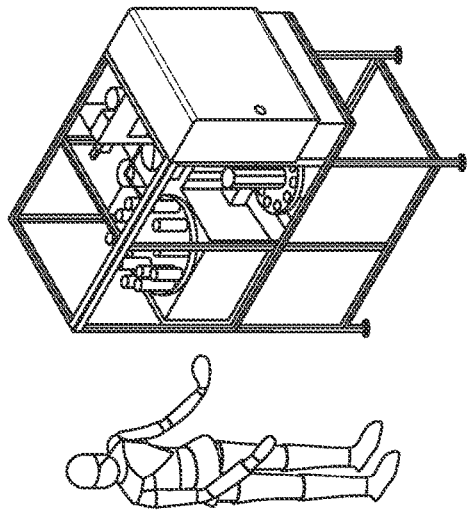
FIGS. 3B and 3C show embodiments of identification tags in accordance with the present disclosure.
Figure 3B:
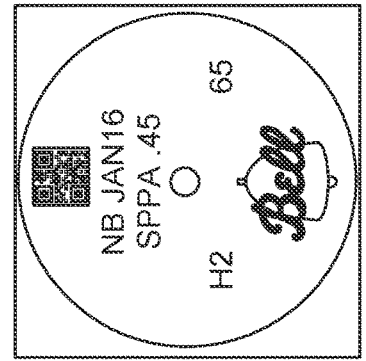
Figure 3C:
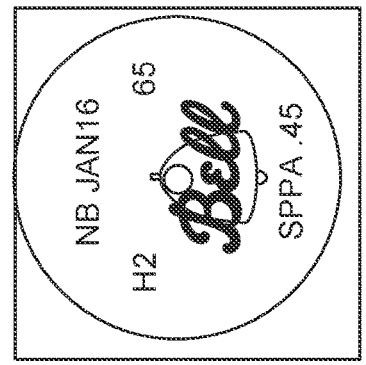

FIG. 2A depicts a cross sectional view of a blank tag 110 and FIG. 2B illustrates a plan view of tag 110. In some implementations, and as illustrated in FIG. 2B, the blank tag 110 can include a plurality of layers of material 112, 114, 116, 118 as well as a base structural layer 117 formed from a metal or other material. An outermost layer 112 can be a planar layer, or can be an encapsulating layer, such as one formed from a material that is resistant to UV light or having other properties, as discussed in further detail below. FIGS. 3B and 3C illustrate embodiments of identification tags in accordance with the present disclosure. As illustrated, both tags include a corporate logo and other information. The embodiment of FIG. 3C further presents a QR code. It will be appreciated that the tags, while illustrated as being round and of a particular diameter, can be any shape and size, as desired, for example, between one half an inch and six inches along a lateral dimension, or any increment therebetween in increments of an eighth of an inch. The tag can be any shape, such as circular, ellipsoid, polygonal, the outline of a logo, and the like.

The outermost layer 112 and/or an inner layer can include pigment, such as in the form of a painted layer, or in the form of an anodized layer (e.g., anodized aluminum). An advantage of anodizing an aluminum component such as those disclosed herein is increased durability and lifespan, as well as reduced maintenance. For example, anodized surfaces sometimes take on dirt and stains, but through a simple cleaning process (e.g., by using a mild detergent) one can restore the finish to an appearance that appears new. Anodized finishes have a lifespan of about 20 years, which far exceeds that of a coat of non-volatile organic paint. Harder than powder coating, anodizing is ideal for areas of high traffic or heavy equipment use, as the coating won't actively take damage from physical contact or harsh chemicals.

When a laser is provides as a light source 130, the laser 130 can ablate at least a portion of one or more layers 112, 114 of the blank tag 110 to form the at least one character 120. The computer or controller 140 can be programmed to encode information into the blank tag, for example, by selectively ablating a first layer of material (e.g., 112) in a first location 120b of the tag to encode information into the tag, and selectively first and second layers of material (e.g., 112, 114) in a second location 115 of the tag to encode further information.

In some implementations, the tag can be formed at least in part by depositing a layer of material on a blank tag that includes at least one pigment. The pigment, which may be mixed with other materials, can be deposited in a variety of manners. For example, the layer of material (e.g., 112, 114, etc.) may include one or more pigments and may be deposited by anodizing, or by way of a printer (not shown) that is operably coupled to the processor circuit. If desired, the light source can be configured to interact with the layer of material (e.g., 112) deposited by the printer. For example, the light source 130 can interact with the layer of material deposited by the printer by curing at least a portion of the layer of material, wherein the layer of material includes polymeric material that can be cross-linked by exposing it to UV radiation. Additionally or alternatively, the light source 130 can cause a portion of the layer of material to be ablated. In further implementations, more than one light source 130 can be provided. For example, a first light source can be provided to cure or otherwise form the layer of material at a first wavelength (e.g., in an ultraviolet portion of the spectrum), and a second light source can be used to alter the appearance of or ablate the layer of material. The intensity of the light can likewise be controlled, as desired, to achieve curing of material, or ablation of the material. In further implementations, the light source 130 can interact with the layer of material deposited by the printer by melting at least a portion of the layer of material. For example, the layer of material (e.g., 112) can include a powder or a slurry that may or may not include an infrared absorbing material, and the light source 130 can include an infrared lamp or laser or other type of laser, that emits light at a sufficient frequency and power level to cause the material to fuse to itself and to the tag.

If a printer is used to form one or more layers of the tag 110, the printer can include a printer circuit operably coupled to the processor circuit, and at least one of the processor circuit and the printer circuit can be configured to deposit the layer of material in a color that matches predetermined color coordinates. For example, the color coordinates can be defined in accordance with L*a*b* color space. If desired, the color coordinates can be defined as a Pantone color. If desired, the system and method can include directly measuring the color coordinates of the tag after the layer of material has been deposited to confirm that the color coordinates of the deposited material are within a predetermined tolerance.

In some embodiments, it can be advantageous to maintain a certain degree of smoothness of the finished tag. For example, at least a portion of the marked tag 100 can have a surface roughness $R_a$ below a predetermined threshold after it is formed. For example, the predetermined threshold can be below 0.1 micron, below 10 microns, or below 100 microns. If desired, the surface roughness $R_a$ can be between about 0.1 microns and about 100 microns, or any increment therebetween of 0.1 microns, inclusive of the endpoints of that range. If desired, the surface roughness $R_a$ can be within any subrange between about 0.1 microns and about 100 microns that is between about 0.5 microns and about 20 microns.

In some implementations, at least a portion of the marked tag can include a hydrophobic coating, a hydrophilic coating, and/or a UV-resistant coating. If desired, the coating can be deposited on the tag prior to or after marking. In some implementations, the coating can include a fluorinated material, such as polytetrafluoroethylene (PTFE), polyvinylidene fluoride (PVDF), or others, for example.

FIG. 3 depicts a further embodiment of a system in accordance with the disclosure to form indicia into identification tags. The system of FIG. 3 includes various systems for producing tags with indicia from blank tags. It will be appreciated that any of the disclosed embodiments can use tags of any shape, (circular, oval, rectangular, etc. System 200 includes a rotary conveyor 260 that includes a plurality of locations for carrying blank tags 110. Rotary conveyor 260 is configured to rotate about a central spindle by way of a computer controlled stepper motor, for example, that is in turned controlled by a programmable logic controller ("PLC") (not shown in FIG. 3). System 200, as depicted, includes a frame or chassis to which other system components are fastened. Preferably, the device 200 is enclosed by an enclosure formed from panels (transparent or opaque) coupled to the frame. The device 200 further includes a computer controlled laser 230 disposed therein operably coupled to a controller (not shown). Preferably, system 200 includes an interlocked door to access a volume inside the device that is coupled to a control system that locks out the laser from operating when the door is open. The interior space can be accessed by the door, for example, when inserting blank tags 110 to be marked, or when removing marked tags or performing system maintenance. The rotary conveyor or dial table 260 can be provided with bins at each location disposed about the conveyor that can each hold a plurality of tags 110 to be marked. A loading arm can also be provided that can load or unload tags from bins. A pneumatic gate can also be provided to convey marked tags through the dial table 260 to another location within system 200.

Figure 4:
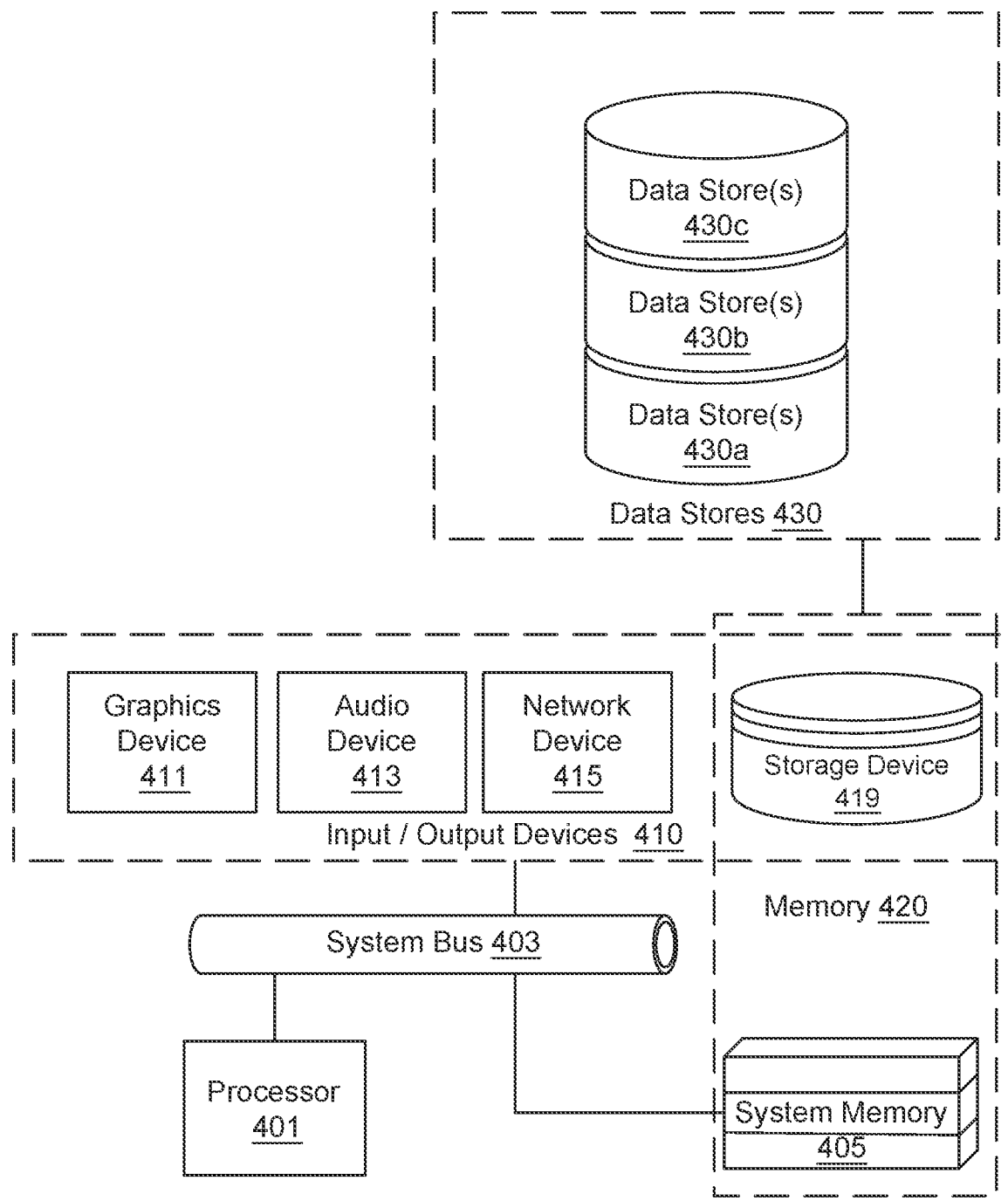
FIG. 4 shows a schematic of a system coordinator in accordance with the present disclosure.

FIG. 4 shows a block diagram illustrating an exemplary system coordinator in one embodiment of the disclosure. The system coordinator, such as may be implemented on a client (e.g. user) device. The system coordinator facilitates the control of formation of tags bearing indicia as set forth herein, and/or the use of that information after it is installed on an article of manufacture. For example, the system coordinator may receive, obtain, aggregate, process, generate, store, retrieve, send, delete, input, output, and/or the like data (including program data and program instructions); may execute program instructions; and may communicate with computer systems, nodes, users, and/or the like. In various embodiments, the system coordinator may comprise a standalone computer system, a distributed computer system, a node in a computer network (i.e., a network of computer systems organized in a topology), a network of system coordinators, and/or the like. It is to be understood that the system coordinator and/or the various system coordinator elements (e.g., processor, system bus, memory, input/output devices) may be organized in any number of ways (i.e., using any number and configuration of computer systems, computer networks, nodes, system coordinator elements, and/or the like) to generate a relative importance of entities in a supply chain in accordance with the disclosure. Furthermore, it is to be understood that the various coordinator computer systems, coordinator computer networks, coordinator nodes, coordinator elements, and/or the like may communicate among each other in any number of ways to facilitate system operation. As used in this disclosure, the term "administrator" or "user" refers generally to people and/or computer systems that interact with the system; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The system coordinator 401 can be used to form tracking information for an article of manufacture. Certain implementations of the apparatus can include a memory circuit including data stored thereon in machine readable format. The system coordinator includes a processor 401 that executes program instructions (e.g., system program instructions). The processor may be implemented using integrated circuits (ICs), application-specific integrated circuits (ASICs), field-programmable gate arrays (FPGAs), and/or the like. The processor may be connected to system memory 405 via a system bus 403. The system bus may interconnect these and/or other elements of the system coordinator via electrical, electronic, optical, wireless, and/or the like communication links. In various embodiments, the system bus may comprise one or more control buses, address buses, data buses, memory buses, peripheral buses, and/or the like. The processor may access, read from, write to, store in, erase, modify, and/or the like, the system memory in accordance with program instructions executed by the processor. The system memory may facilitate accessing, storing, retrieving, modifying, deleting, and/or the like data by the processor.

In various embodiments, input/output devices 410 may be connected to the processor and/or to the system memory, and/or to one another via the system bus. In some embodiments, the input/output devices may include one or more graphics devices 411. The processor may make use of the one or more graphic devices in accordance with program instructions (e.g., system program instructions) executed by the processor. The graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 413. The processor may make use of the one or more audio devices in accordance with program instructions (e.g., system program instructions) executed by the processor. In one implementation, an audio device may be a sound card that may obtain (e.g., via a connected microphone), process, output (e.g., via connected speakers), and/or the like audio data (e.g., system data). The audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 415. The processor may make use of the one or more network devices in accordance with program instructions (e.g., system program instructions) executed by the processor. In one implementation, a network device may be a network card that may obtain, process, output, and/or the like network data (e.g., system data). The network device may be discreet, external, embedded, integrated into a motherboard, and/or the like. The network device may operate in combination with other network devices (e.g., in parallel) to provide improved data throughput, redundancy, and/or the like. In some embodiments, the input/output devices may include one or more storage devices 419. The processor may access, read from, write to, store in, erase, modify, and/or the like a storage device in accordance with program instructions (e.g., system program instructions) executed by the processor. A storage device may facilitate accessing, storing, retrieving, modifying, deleting, and/or the like data (e.g., system data) by the processor. In one implementation, the processor may access data from the storage device directly via the system bus. In another implementation, the processor may access data from the storage device by instructing the storage device to transfer the data to the system memory and accessing the data from the system memory.

The storage device 419 may be discreet, external, embedded, integrated (e.g., into a motherboard, into another storage device), and/or the like. A storage device 419 may operate in combination with other storage devices to provide improved capacity, data throughput, data redundancy, and/or the like. Together and/or separately the system memory 405 and the one or more storage devices 419 may be referred to as memory 420 (i.e., physical memory).

System memory 420 contains processor-operable (e.g., accessible) system data stores 430. Data stores 430 comprise data that may be used (e.g., by the system) via the system coordinator. Such data may be organized using one or more data formats such as a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Data stores 430 may comprise a non-transitory machine readable medium storing instructions executable by processor 401 to perform a specified function. Accordingly, each of the respective data stores 430a-430c include programmatic instructions which, when executed by processor 701, provide for determination of a relative importance score for each respective entity in the supply chain in accordance with the present disclosure.

For example, data stores 430a-430c may include instructions executable by processor 401 to retrieve from at least one company database including customer data. If desired, the processor circuit can be operably coupled to a scanner, for example, configured to read information. The processor circuit can execute instructions to operate the scanner to read information and extract and store information in a memory circuit. Information obtained via said scanner can include the data relating to the article of manufacture, such as a wooden utility pole, including those types of data described above. In some implementations, the processor circuit can further execute instructions to encrypt said data prior to forming indicia into a particular identification tag.

As another illustration, data stores 430a-430c may include instructions executable by processor 401 to prioritize production of a first set of identification tags over production of a second set of identification tags. For example, the coordinator circuitry can execute instructions to prioritize production of a first set of identification tags over production of a second set of identification tags in order to synchronize production of the identification tags with production of articles of manufacture that will bear identification tags from the first set of identification tags. For example, the system can access data indicating a production schedule for articles that the tags will be mounted on at a later time. The processor circuit can execute instructions to prioritize production of a first set of identification tags over production of a second set of identification tags, for example, in response to a work order being processed by the system. If desired, the processor circuit can execute instructions to prioritize production of a first set of identification tags over production of a second set of identification tags in response to a change in a work order being processed by the processor circuit. In some implementations, the processor circuit can execute instructions to prioritize production of a first set of identification tags over production of a second set of identification tags in response to a work order being released, wherein the work order is released in response to the receipt of user input.

Data stores 430a-430c may also include instructions executable by processor 401 to generate for display on a graphical user interface a first display including a layout of the tag 110 including spatial fields of the tag (e.g., 120a-f) as set forth in FIG. 2B. The data stores 430a-430c may also include instructions executable by processor 401 to generate for display on a graphical user interface a third display including a supplier industry activity display including information on industry segments to which the entity is exposed, and a fourth display including the relative importance score for each respective entity in the supply chain.

In some examples, the data stores 430a-430c include instructions executable by processor 401 to receive as data input, data from a tag that is scanned by maintenance personnel that are tasked to inspect and if needed, treat, repair or replace a utility pole. The instructions can be executable to parse information obtained via a scanner from the marked tag that is disposed on an article of manufacture. The instructions can cause the system to access a maintenance portal relating to the article of manufacture, and to receive inputs summarizing a maintenance or treatment procedure on the article of manufacture by any personnel.

Data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, system coordinator elements, and/or the like) to facilitate system operation. For example, system data stores may comprise data stores 430a-c implemented as one or more databases.

The entirety of this disclosure (including the written description, figures, claims, abstract, appendices, and/or the like) shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure.

Furthermore, alternate undescribed embodiments may be available (e.g., equivalent embodiments). Such alternate embodiments have not been discussed in detail to preserve space and/or reduce repetition. That alternate embodiments have not been discussed in detail is not to be considered a disclaimer of such alternate undescribed embodiments, and no inference should be drawn regarding such alternate undescribed embodiments relative to those discussed in detail in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the system coordinator, system coordinator elements, system data stores, system components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the system coordinator, system coordinator elements, system data stores, system components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure.

Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, non-provisional applications, continuation applications, continuation-in-part applications, divisional applications, and/or the like. It is to be understood that while some embodiments of the system discussed in this disclosure have been directed to monitoring real time electronic trading data systems, the innovations described in this disclosure may be readily applied to a wide variety of other fields and/or applications.

What is claimed is:

1. A method for associating tracking information with a laminated member, the method comprising:
providing a blank tag for the laminated member; and
providing an apparatus for forming information into the blank tag to access tracking information for the laminated member including:
a memory circuit including data stored thereon in machine readable format, the data including information to access the tracking data for the laminated member;
a light source including a light source control circuit operable to operate the light source; and
a processor circuit operably coupled to the memory circuit and the light source control circuit, the processor circuit being configured to operate the light source, wherein the processor circuit executes instructions to (i) retrieve from said memory circuit said information to access the tracking data for said laminated member, and (ii) operate said light source to form at least one character into a surface of the blank tag, said at least one character being encoded with said information to access the tracking data relating to said laminated member; and
forming a marked tag from the blank tag by way of the apparatus by forming at least one character on the blank tag using the light source of the apparatus, the at least one character being encoded with said information to access the tracking data for said laminated member to permit an observer to retrieve information about the laminated member after the laminated member has been installed.

2. The method of claim 1, wherein the blank tag includes a plurality of layers of material, wherein the light source includes a laser, and further wherein the laser ablates at least a portion of an outermost layer of said plurality of layers to form said at least one character.

3. The method of claim 2, wherein the outermost layer includes pigment or paint.

4. The method of claim 2, wherein the outermost layer includes anodized material.

5. The method of claim 2, wherein the at least one character includes a bar code, a QR code, or a logo.

6. The method of claim 1, wherein the light source includes a laser, and further wherein the blank tag includes a plurality of layers that can be ablated by the laser, and further wherein information is encoded into the blank tag by selectively ablating a first layer of material in a first location of the tag to encode information into the tag.

7. The method of claim 6, further comprising selectively ablating the first layer of material and a second layer of material in a second location of the tag to encode further information.

8. The method of claim 1, wherein forming the at least one character causes a portion of material forming the tag to become oxidized.

9. The method of claim 8, wherein oxidizing the material forming the tag enhances visual contrast of said at least one character with respect to a portion of the tag that surrounds said at least one character.

10. The method of claim 1, wherein the at least one character includes information relating to a URL that includes the tracking data relating to the article of manufacture.

11. The method of claim 1, wherein the laminated member is a utility pole or a structure, and the tracking data relates to at least two of (i) a species of tree that the utility pole or the structure is formed from, (ii) at least one preservative/preservative system used to manufacture the utility pole or the structure, (iii) a location where the utility pole or the structure was treated with the preservative/preservative system, (iv) a length of the utility pole or the structure, (v) a year in which the utility pole or the structure was treated with the preservative/preservative system, (vi) the year in which a tree was felled that was used to make the utility pole or the structure, (vii) an inspection agency tasked with inspecting the utility pole or the structure, (viii) a logo of a utility company, (ix) a URL leading to a customer portal of a utility, (x) a URL leading to a portal of a utility company for an inspector, (xi) a unique tracking number corresponding to the utility pole or the structure, (xii) a storage location for the utility pole or the structure, (xiii) a date of installation of the utility pole or the structure, and (xiv) a class of the utility pole or the structure, (xv) the month of manufacture of the utility pole or the structure.

12. The method of claim 1, further comprising disposing the tag on the laminated member.

13. The method of claim 1, wherein the forming step includes programming a computer operably coupled to the light source to form the at least one character on the blank tag, wherein programming the computer includes populating a plurality of data fields, wherein each of said data fields is mapped to a different physical region of the blank tag, and still further wherein at least one of the data fields includes an incremental unit number assigned to the tag that is automatically incremented for a further tag for a second laminated member.

14. The method of claim 1, wherein the processor circuit further executes instructions to prioritize production of a first set of identification tags over production of a second set of identification tags in order to synchronize production of the identification tags with production of laminated members that will bear identification tags from the first set of identification tags.

15. A method for associating tracking information with a lamp pole, the method comprising:
- providing a blank tag for the lamp pole; and
- providing an apparatus for forming information into the blank tag to access tracking information for the lamp pole including:
  - a memory circuit including data stored thereon in machine readable format, the data including information to access the tracking data for the lamp pole;
  - a light source including a light source control circuit operable to operate the light source; and
  - a processor circuit operably coupled to the memory circuit and the light source control circuit, the processor circuit being configured to operate the light source, wherein the processor circuit executes instructions to (i) retrieve from said memory circuit said information to access the tracking data for said lamp pole, and (ii) operate said light source to form at least one character into a surface of the blank tag, said at least one character being encoded with said information to access the tracking data relating to said lamp pole; and
- forming a marked tag from the blank tag by way of the apparatus by forming at least one character on the blank tag using the light source of the apparatus, the at least one character being encoded with said information to access the tracking data for said lamp pole to permit an observer to retrieve information about the lamp pole after the lamp pole has been installed.

16. A method for associating tracking information with a utility structure, the method comprising:
- providing a blank tag for the utility structure; and
- providing an apparatus for forming information into the blank tag to access tracking information for the utility structure including:
  - a memory circuit including data stored thereon in machine readable format, the data including information to access the tracking data for the utility structure;
  - a light source including a light source control circuit operable to operate the light source; and
  - a processor circuit operably coupled to the memory circuit and the light source control circuit, the processor circuit being configured to operate the light source, wherein the processor circuit executes instructions to (i) retrieve from said memory circuit said information to access the tracking data for said utility structure, and (ii) operate said light source to form at least one character into a surface of the blank tag, said at least one character being encoded with said information to access the tracking data relating to said utility structure; and
- forming a marked tag from the blank tag by way of the apparatus by forming at least one character on the blank tag using the light source of the apparatus, the at least one character being encoded with said information to access the tracking data for said utility structure to permit an observer to retrieve information about the utility structure after the utility structure has been installed.

17. A method for associating tracking information with a structural member, the method comprising:
- providing a blank tag for the structural member; and
- providing an apparatus for forming information into the blank tag to access tracking information for the structural member including:
  - a memory circuit including data stored thereon in machine readable format, the data including information to access the tracking data for the structural member;
  - a light source including a light source control circuit operable to operate the light source; and
  - a processor circuit operably coupled to the memory circuit and the light source control circuit, the processor circuit being configured to operate the light source, wherein the processor circuit executes instructions to (i) retrieve from said memory circuit said information to access the tracking data for said structural member, and (ii) operate said light source to form at least one character into a surface of the blank tag, said at least one character being encoded with said information to access the tracking data relating to said structural member; and
- forming a marked tag from the blank tag by way of the apparatus by forming at least one character on the blank tag using the light source of the apparatus, the at least one character being encoded with said information to access the tracking data for said structural member to permit an observer to retrieve information about the structural member after the structural member has been installed;
- wherein the structural member is one of a column, a beam, or a truss.

* * * * *